United States Patent Office 2,889,305
Patented June 2, 1959

2,889,305

CORROSION-RESISTANT COATINGS CONTAINING COAL TAR OIL AND AN EPOXY RESIN

Stanley L. Lopata, Ladue, Mo.

No Drawing. Application March 11, 1957
Serial No. 644,986

12 Claims. (Cl. 260—33.6)

This invention relates in general to certain new and useful improvements in corrosion-resistant coatings and, more particularly, to an initially fluid coating material which can be applied to a wide variety of surfaces by brushing, dipping, or spraying and will set up to form a tough, durable, corrosion-resistant coating.

At the present time, most types of metallic and concrete surfaces, which are subjected to any material degree of corrosive or weathering conditions, can be protected by the application of paint-like coatings. Usually, such materials consist of oleoresinous, phenolic, vinyl, or similar synthetic vehicles, suitable pigments, and evaporable thinners. Such materials, however, are not adequately corrosion-resistant because they can be applied in thin films only and, therefore, have somewhat limited resistance to chemical fumes and physical stress. Consequently, there have been a number of efforts, in recent years, to formulate corrosion-resistant coatings with epoxy resins, various types of pitches, such as phenolic pitch and coal tar pitch, which have much greater film thickness. Such coating materials, however, while having reasonably satisfactory corrosion resistance, nevertheless become rather brittle particularly in outdoor weathering and are not suitably water-resistant. Moreover, existing types of epoxy resin-pitch mixtures may possess good acid resistance and poor alkali resistance, or, contrariwise, may possess good alkali resistance and poor acid resistance. However, such materials do not seem to be broadly resistant to chemical attack, corrosion, weathering, water, and the disruptive forces set up by temperature changes.

It is, therefore, the principal object of the present invention to provide coating materials which can be used over a wide range of conditions encountered in commercial coating practice by various methods of application, such as brushing, spraying, and dipping, and will set up or solidify into a coating having excellent corrosion resistance, weather resistance, water resistance, and flexibility.

It is another object of the present invention to provide a coating material of the type stated which is economical in cost, can be applied in any simple, economical and expedient manner, and is extremely durable under the most adverse conditions.

With the above and other objects in view, my invention resides in the novel processes and compositions of matter presently described and pointed out in the claims.

Broadly speaking, the present invention comprises the combination of epoxy resins with the middle oil fraction resulting from the distillation of coil tar to form a liquid coating material which can be compounded with finely ground inert fillers, such as talc, silica, barytes, pigments, such as powdered aluminum, carbon blacks, titanium dioxide, iron oxide, and one or more solvents or diluents of the aromatic hydrocarbon, ketone, alcohol, glycol, ether, and ester types.

The epoxy ethers or resins employed in connection with the present invention contain, along with the usual ether linkage, various glycidyl groups in such quantity that the material has a 1,2-epoxy equivalency in the average molecule, of two. By the epoxy equivalency, reference is made to the average number of 1,2-epoxy groups

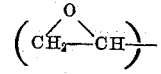

contained in the average molecule of the ether.

A preferred group of epoxy ethers for use in the invention is prepared by reacting a dihydric phenol with epichlorhydrin in alkaline solution. These products are of resinous character and may be either solid or liquid at normal temperature (20–30° C.). Any of the various dihydric phenols are used in preparing these glycidyl ethers, including mononuclear phenols like resorcinol, catechol, hydroquinone, etc., or polynuclear phenols like bis-(4-hydroxyphenyl)-2,2-propane (bis-phenol), 4,4'-dihydroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(hydroxy-2-tertiary butyl phenyl)-2,2-propane, bis-(2-dihydroxynaphthyl)-methane, 1,5-dihydroxy naphthalene, etc. The product may be represented by the formula:

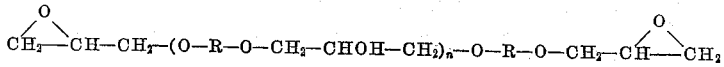

wherein $n$ is an integer, preferably from 1 to 7, and R represents the divalent hydrocarbon radical of the dihydric phenol. The $n$ value, or molecular weight, is controlled by varying the mol ratio of epichlorohydrin to bisphenol. The reaction of 2 mols of epichlorohydrin with one mol of bisphenol will give the diglycid ether of bisphenol. This compound is called the "$n=$zero" resin as there is no repeating unit in the molecule. A 3:2 ratio of epichlorohydrin to bisphenol gives the "$n=1$" product, a 4:3 ratio gives the "$n=2$" product, etc. It has also been found possible to use 1,2-epoxy-containing polyethers of polyhydric alcohols, such as polyglycidyl ethers thereof, like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols having a 1,2-epoxy equivalency two, such as the polyglycidyl ethers of glycol, diglycerol, erythritol, pentaglycerol, mannitol, sorbitol polyallyl alcohol, polyvinyl alcohol, and the like.

The middle oil employed in the present invention is the product of distillation of coal tar and is, generally speaking, the distillate which comes over in the range between 200° C. and 270° C. It has also been found that, in addition to middle oil, it is possible to employ blends of middle oil and heavy oil, the latter being the distillate from coal tar which comes over in the range between 270° C. and 320° C. The mixture of epoxy resin and oil may, if desired, be modified by the addition of fillers, pigments, and vehicles to provide a coating material.

Where the coating materials of the present invention are to be applied and allowed to set up at ordinary temperatures, such as room temperature, it is necessary to add an agent for rapid setting or curing of the coating, which setting or curing agent should be added just prior to application of the coating material to the surface being coated. The setting or curing agents which have been found to be suitable are poly-functional amines, such as ethylene diamine, ethylene triamine, diethylene triamine, benzyl dimethylamine, 3-dimethylaminopropylamine, 3-diethylaminopropylamine, tetraethylene pentamine, or polyamide resins made by condensation of dimerized and trimerized unsaturated fatty acids of vegetable oils with a diamine (e.g. di-and-tri linoleic acids and ethylene diamine). These agents, which apparently effect cross linking in the epoxy resin, may be used in various amounts, although they usually are employed in the range of from 0.05 to 0.25 part per part by weight of epoxy resin. On the other hand, the coating material of the present invention may be applied in any conventional or desired manner and heat cured, in which case the above-mentioned curing agents are not necessary and may be omitted. However, a dibasic acid anhydride, such as phthalic anhydride, maleic anhydride, or succinic anhydride, must be added. Such anyhdride may be added at any time because it only becomes activated as a curing agent under heat.

The quantity of epoxy resin admixed with the middle oil and, if desired, filler and vehicle, according to the invention, can be widely varied. Thus, compositions of the invention may comprise from 25 to 90 parts epoxy ether resin and from 75 to 10 parts middle oil based on 100 parts by weight of the total resin-oil content.

As indicated above, aromatic hydrocarbon solvents, i.e., solvents or diluents, such as high flash naphtha, xylol, toluol, and the like, may be incorporated in the compositions of the invention in amounts sufficient to reduce the viscosity of the composition to a workable consistency. As will be appreciated, the aromatic hydrocarbon solvent may be excluded if a workable viscosity is obtained without the same.

The invention is further illustrated, but not limited, by the following examples, wherein parts and percentages referred to are on a weight basis.

*Example I*

The following product was prepared by uniformly mixing the designated ingredients together:

Coating material—
  100 parts epoxy ether resin
  100 parts middle oil
Curing agent—10 parts diethylene triamine

*Example II*

As in Example I, the following product was formed:

Coating material—
  100 parts epoxy ether resin
  80 parts middle oil
  80 parts clay
  100 parts carbon
  15 parts xylol
Curing agent—10 parts diethylene triamine

*Example III*

As in Example I, the following product was formed:

Coating material—
  100 parts epoxy ether resin
  50 parts middle oil
  35 parts phthalic anhydride
  3 parts finely divided silica Must be heat cured at 300–375° F. for 15–30 minutes.

The following table indicates the comparative value of coatings of the present invention.

FLEXIBILITY OF COATINGS EXPOSED IN AN ATLAS TWIN ARC WEATHER-OMETER WITH 165° BLACK SURFACE TEMPERATURE WITH A 3-MINUTE WET CYCLE AND 17-MINUTE DRY CYCLE

| Composition | Initial flexibility | 24-hour flexibility | 70-hour flexibility | 240-hour flexibility |
| --- | --- | --- | --- | --- |
| Middle oil epoxy resin combination (Example I) | 10 | 10 | 10 | 10 |
| Coal-tar pitch epoxy resin combination (U.S. Pat. #2,765,288) | 10 | 5 | 4 | 1 |

The rating of 10 indicates good flexibility based on a 90° sharp angle bend. The rating of 1 indicates lowest flexibility.

It should be understood that changes in the methods, compositions, and combinations above set forth may be made without departing from the nature and principle of my invention.

Having thus described my invention, what I claim and desire to secure by Letters Patent is:

1. A coating composition comprising an epoxy ether resin having a 1,2-epoxy equivalency of two and an oil which is distilled from coal tar in the temperature range of 200° C. to 320° C.

2. A coating composition comprising an oil which is distilled from coal tar in the temperature range of 200° C. to 320° C., and an epoxy ether resin having a 1,2-epoxy equivalency of two, said epoxy ether resin constituting from 25 to 90 percent by weight of the total composition.

3. A coating composition comprising middle oil distilled from coal tar in the temperature range of 200° C. to 320° C., an epoxy ether resin having a 1,2-epoxy equivalency of two, and a polyfunctional amine curing agent.

4. The coating composition of claim 3, including a filler.

5. The coating composition of claim 4, including an aromatic hydrocarbon solvent.

6. A coating composition comprising middle oil distilled from coal tar in the temperature range of 200° C. to 320° C. substantially insoluble in alkali, ethanol, and isopropanol, a glycidyl polyether of a dihydric phenol having a 1,2-epoxy equivalency of two, and a curing agent for said glycidyl polyether wherein said glycidyl polyether is between 25% and 75% of the mixture of glycidyl polyether and said middle oil.

7. The coating composition of claim 6, wherein the epoxy ether resin has an epoxy value of two and a melting point no greater than 80° C.

8. The coating composition of claim 6, including a filler.

9. The coating composition of claim 6, including an aromatic hydrocarbon solvent.

10. The coating composition of claim 6, including an aromatic hydrocarbon solvent and a filler.

11. A coating composition comprising middle oil and an epoxy ether resin wherein the middle oil is distilled from coal tar in the temperature range of 200° C. to 270° C. and the epoxy resin has a 1,2-epoxy equivalency of 2.

12. A coating composition comprising an oil and an epoxy ether resin wherein the oil is distilled from coal tar in the temperature range of 270° C. to 320° C. having a 1,2-epoxy equivalency of two.

References Cited in the file of this patent

UNITED STATES PATENTS 2,765,288    Whittier _____ Oct. 2, 1956

OTHER REFERENCES

Bennett: Concise Chemical and Technical Dictionary, Chemical Publishing Company, Inc., New York 1947, pages 177 and 178.